(12) United States Patent
Scott et al.

(10) Patent No.: US 6,483,646 B2
(45) Date of Patent: Nov. 19, 2002

(54) DETACHABLE MONOCULAR DISPLAY

(76) Inventors: Thomas P. Scott, 600 W. County Line Rd., Unit 21-103, Littleton, CO (US) 80126; David Witt, 10615 W. Ontario, Littleton, CO (US) 80127

(*) Notice: Subject to any disclaimer, the term of this patent is extended or adjusted under 35 U.S.C. 154(b) by 0 days.

(21) Appl. No.: 09/932,258

(22) Filed: Aug. 16, 2001

(65) Prior Publication Data

US 2002/0044361 A1 Apr. 18, 2002

Related U.S. Application Data

(60) Provisional application No. 60/225,587, filed on Aug. 16, 2000.

(51) Int. Cl.[7] .............................. G02B 27/14; G09G 5/00
(52) U.S. Cl. ........................ 359/631; 359/630; 359/638; 345/8
(58) Field of Search .................................. 359/630, 631, 359/632, 633, 638, 640, 385; 345/7, 8, 9

(56) References Cited

U.S. PATENT DOCUMENTS

| 371,549 A | 10/1887 | Chivill ........................ 198/713 |
|---|---|---|
| 4,902,116 A | 2/1990 | Ellis ........................... 359/480 |
| 5,003,300 A | 3/1991 | Wells ............................. 345/8 |
| 5,162,828 A | 11/1992 | Furness et al. .............. 353/122 |
| 5,384,654 A | 1/1995 | Iba .............................. 359/634 |
| 5,436,765 A | 7/1995 | Togino ........................ 359/631 |
| 5,539,578 A | 7/1996 | Togino et al. ............... 359/630 |
| 5,661,604 A | 8/1997 | Kuba .......................... 359/637 |
| 5,701,202 A | 12/1997 | Takahashi .................... 359/631 |
| 6,212,020 B1 * | 4/2001 | Ahhlgren et al. ........... 359/815 |
| 6,222,677 B1 * | 4/2001 | Budd et al. ................. 359/630 |
| 6,249,386 B1 * | 6/2001 | Yona et al. ................. 359/630 |
| 6,140,980 A1 * | 10/2001 | Spitzer et al. ................. 345/8 |

* cited by examiner

Primary Examiner—Loha Ben
Assistant Examiner—Saeed Seyrafi
(74) Attorney, Agent, or Firm—Dorr, Carson, Sloan & Birney, P.C.

(57) ABSTRACT

The present invention is an apparatus for monocular head displays, which enables a compact, light in weight, sturdy apparatus that has a wide angle of viewing, a bright and sharp image display that operates on low voltage in a wide range of temperatures. The image is bright and high in contrast. Due to the compactiveness and wide viewing angle, it is readily useable inside helmets and goggles and visors. The signals that can be used include data, maps, graphics or video images including infrared or other images. Because of the wide viewing angle, the module may be placed and adjusted for multiple users and field installation.

1 Claim, 4 Drawing Sheets

DETACHABLE MONOCULAR DISPLAY

The inventor, Thomas P. Scott, claims priority based on Provisional Patent Application Ser. No. 60/225,/587, filed Aug. 16, 2000, entitled DETACHABLE MONOCULAR DISPLAY.

The invention relates to a novel mountable monocular display that gives durability and stability of its structure, compactness and flexibility in its installations and use over a wide range of environmental conditions and physical needs and wide visual field quality in image and data viewability all with low power consumption.

BACKGROUND OF THE INVENTION

The general use of small display apparatus inside helmets, and head mounted, are well known. They are used in piloting of aircraft, weapons targeting and for tasks that are more common.

There are known various head mounted viewing systems for viewing a plurality of displays. Some of these prior art display units are disclosed in the U.S. Pat. Nos. 5,003,300; 5,162,828; U.S. Pat. No. Des. 371,549 and PCT International Publication No. WO95/11473 published Apr. 27, 1995 and Kuba (U.S. Pat. No. 5,661,604), Togino (U.S. Pat. No. 5,539,578), Iba (U.S. Pat. No. 5,384,654), and Ellis (U.S. Pat. No. 4,902,116). Each of the systems described involve a head mounted display connected to a remote or other signal source for providing the subject matter to be displayed. All of these require precise installation in order to be useable. Thus, they are not field installable and can easily be damaged or misadjusted if handled roughly.

In Wells the U.S. Pat. No. 5,003,300 a head mounted display is disclosed which is connected to a remote signal source which may be a computer, pocket calculator or a radio wave transmitter which provides power, timing information and drawing signals necessary for driving the display. The Wells disclosure includes separate elements of display, optical enlargement and mirrors to initiate a virtual image and movement of the mirror to create a raster image. The drawbacks are the need for precise installation for optics and the raster display, which is not suitable for rough usage or field installation.

The Furness patent U.S. Pat. No. 5,162,828 discloses a display system for conventional eyewear using a transparency. The display system of Furness includes a light transmissive display mounted on the frame of the eyewear and optics for collimating light to project an image of the displayed information at a distance from the user in the periphery of the field of view defined by the transparency. It is important to the Furness head mounted display that there be included a mirror means for collimating light to project the image. Furness also provides automatic adjustment of the optics for various users. Again, the drawbacks are the need for precise and nonrugged installation. Additionally, to raster display has more complexity than the within invention.

The WO95/11473 publication (Kopen) dated Apr. 27, 1995 discloses a multitude of head mounted display configurations. In some of the embodiments disclosed by Kopen the display is connected to a video or information source such that the user can view information or images shown on the display. In one of Kopin's embodiments, the display can be mounted to a frame so that the user can move the display in and out of the user's field of view.

Other patents are directed toward head mounted image display apparatus including: Kuba, U.S. Pat. No. 5,661,604, involving a reflection system to project the image to an observation region. This necessarily requires stability and precise adjustments. Togino, U.S. Pat. No. 5,539,578, discloses an image display apparatus designed to give a wide angle of view using mirrors, to display a virtual image. Mirrors as the transmitter system lacks ruggedness, compactness, and ease of use.

Iba, U.S. Pat. No. 5,384,654, is a compact image device using a prism and a mirror to mount in front of the viewer to display the image. Thus, the direct view of the user is of the displayed image without the ability to view the physical environment.

Togino, U.S. Pat. No. 5,436,765, details an apparatus to obtain a 40° field angle of the view but incorporates a display, an optical relay system comprised of at least two lenses, and a concave mirror to project the image. The lack of ruggedness, compactness, and adjustability are important shortcomings.

In Takahashi, U.S. Pat. No. 5,701,202, the Olympus curvilinear prism is disclosed for general purposes of monocular head displays, but it does not disclose the particulars of the within invention.

The use of displays inside helmets is disclosed in Ellis, U.S. Pat. No. 4,902,116, but requires two collimating reflective eyepieces, and a projector to a reflection surfaces.

Other devices make use of opaque view screens, which prevents visibility or reflections on visors in helmets and headgear, but lack the clarity, the compactness, and the lower power concentration and durability of the within invention.

All mirror based, reflective, projective, or similar structure have major short comings in environments where ruggedness is important, where quick change and adjustment is needed and where 10 compactness, and ease of viewing is essential. Also, many prevent the user from easily viewing his surrounding, necessary for safety and avoidance of dangers in real environments.

SUMMARY OF THE INVENTION

There is a need for a rugged and compact display device that can be moveably and readily installed for users to have available an accessible image of data, viewing of a remote location or enhanced or special views of designated image, such as infrared views to detect heat or other selected criteria.

Therefore it is the object of this invention to provide a display devise that can display signals and information in a peripheral viewing location, thus allowing the user to have a clear view of his actual environment while still having access to display information.

It is another object of the invention to have the display apparatus to have a unitized combination of the display light source, and optics for bending and directing the light for the user.

It is another object of the display apparatus to have it be compact and light enough to fit inside a variety of helmets or masks with a shield or visor, such as firemen wear. For a head band it should not, by it own weight and distance from the eye, create an unwieldy extension. Thus, by being compact and very light it allows the user to move in cramped quarters with quick movements as needed in emergencies in a variety of environments, such as heat, fires, weather, wind, rescue situations or in environmental suits used in toxic emergencies.

It is another object of the invention to have the display with a bright and wide viewing angle, to thus allow for easy placement in one user's helmet in the field and thus, not require precise and permanent installation in order to be used. The wide angle allows for field installation and for easy adjustment or changing of helmets or users for the display.

The invention has further objects consistent with its design and the above advantage over the head mounted displays that are known.

These objects are accomplished by a novel combination of elements. The display, in order to have a high quality image with low power consumption is an active matrix electro luminescent (AMEL) display chip mounted in an epoxy and glass sandwich. The circuit connections are attached to a digital or analog controller through appropriate ribbon or other connectors. The image or data signal to the controller may be by hard wire or wireless.

The sandwich is fixed to one surface of an Olympus curvilinear prism, also known as free form prism.

The combination assembly of the prism and display is very compact and lightweight thus allowing for close viewing and can be moved and mounted in various locations on headbands, inside helmets, and inside visors, or face shields.

By use of the prism, the image is reflected and refracted inside the prism to the exit in a viewing cone with a wide viewing angle for the user's eye.

This wide angle and compactness allows it to be located in an approximate location without the necessity of precise focus and placement. This allows field installation, field adjustment such as moving it to the right or left side of the head as desired or moving into a different location of the peripheral view are as desired.

This wide latitude for useful installation also allows a display module to be easily and quickly changed to a different helmet or to a different user, without any precise tools, checks or adjustments on normal installation hardware.

The object of ruggedness is met by the unitized construction of the display and prism. There are no mirrors, collimators, lens or other separate optical elements to align, or orient. The module is moved as one unit.

The module, because of the bright image from the AMEL and the very high quality of clarity and image transmission through the prism, allows for easy viewing, even in bright backlight conditions.

Due to the unitized construction, and use of the AMEL chip, the module is very stable and usable under extreme temperatures and environmental conditions.

These advantages combined with the wide latitude of viewing and easy field adjustment creates a device that is ideal for fire, rescue, environmental hazard and similar field uses.

A further use is the super position of data images from the display chips and simultaneous transmission of images through the prism of the environment beyond the prism. This allows the placement of the module in locations that with other options would block a view that maybe critical. This use would allow the data view to be simultaneously visible by the user. The free form prism, as the single optical element, allows for simultaneous and easily adjusted viewing of the data or AMEL image, as well as a pass through transmission of the immediate environment at the same time.

DETAILED DESCRIPTION OF THE INVENTION

Figure 4:
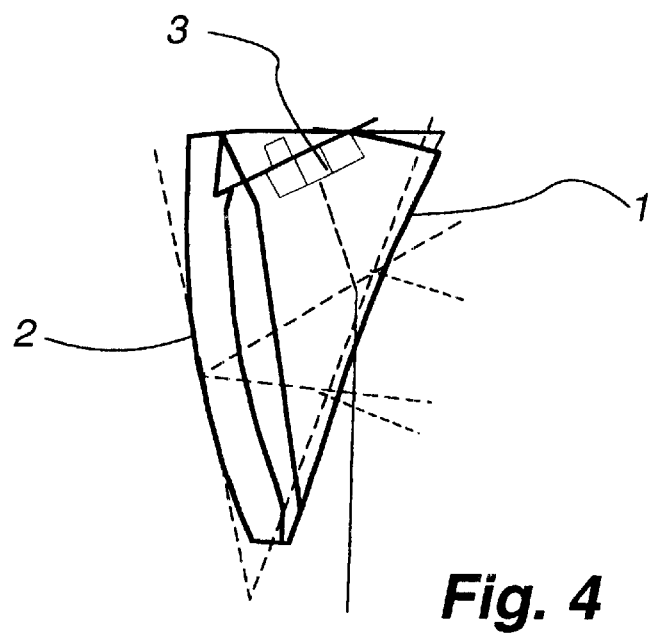
FIG. 4 is a side view of a curvilinear prism.
Figure 5:
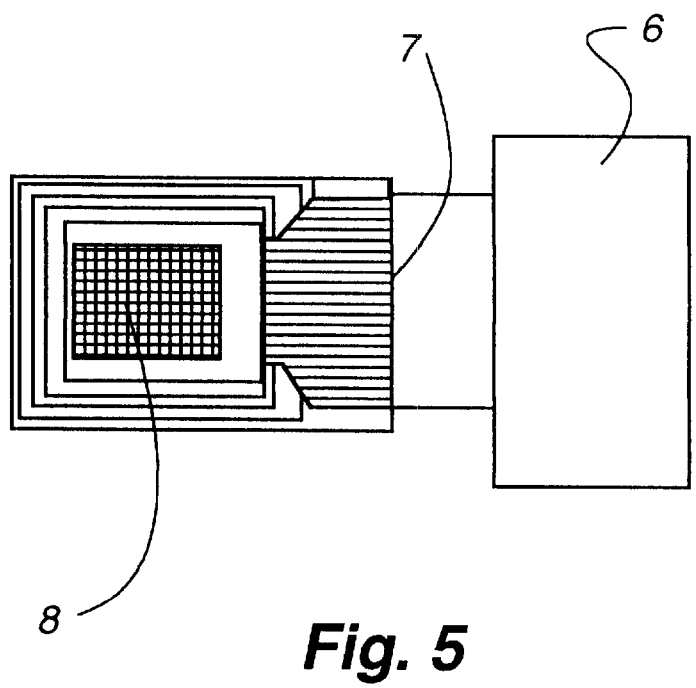
FIG. 5 is an assembly drawing of the display chip sandwich and connectors.
Figure 6:
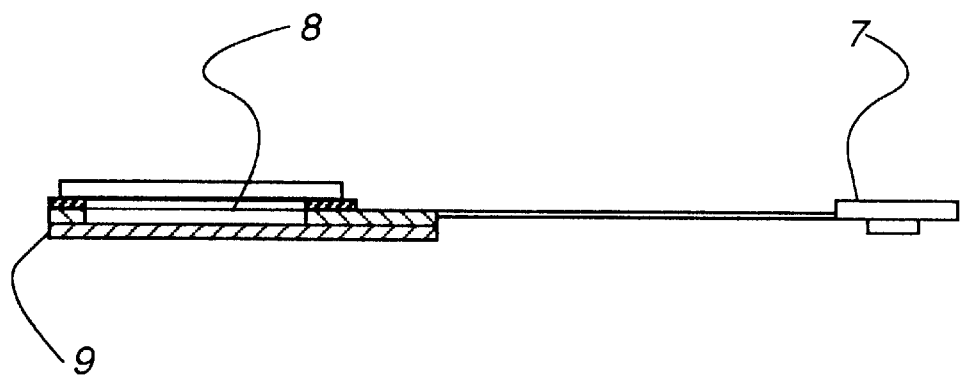
FIG. 6 is a side view of the Chip Sandwich.

The inventor combines the elements of the Olympus prism 1, FIG. 4, with the display chip sandwich 9 FIG. 6, mounted with the display projection against the image surface 3 of the prism. The display chip is an active matrix electro luminescence chip which allows for low and efficient voltage use. The image is bight and with good resolution. The Olympus prism 1 gives excellent optical transmission and light ending and internal reflection.

The controller 6 is attached to the image module 4 by common controller connectors 7. The controller may be either digital or analog, with digital having advantages of low power consumption and ease of translation to the AMEL image chips.

The controller 6 is able to be stored on the user, in a backpack, on a belt or other suitable portable locators. The signal whether the data or images can be transmitted to the controller by wireless, yielding movement of the user free from the signal source, or by hardware.

The display chip sandwich 9 is placed on the prism 1 so that the display field 8 is mating with the flat image surface 3 of the prism 1.

The attachment of the display chip sandwich 9 and the prism 1 is with any suitable adhesive to meet the requirement of withstanding the anticipated environment and not permanently damaging the prism or display sandwich.

The display module 4 is then mountable where desired by use of any commonly available mounting methods.

Figure 1:
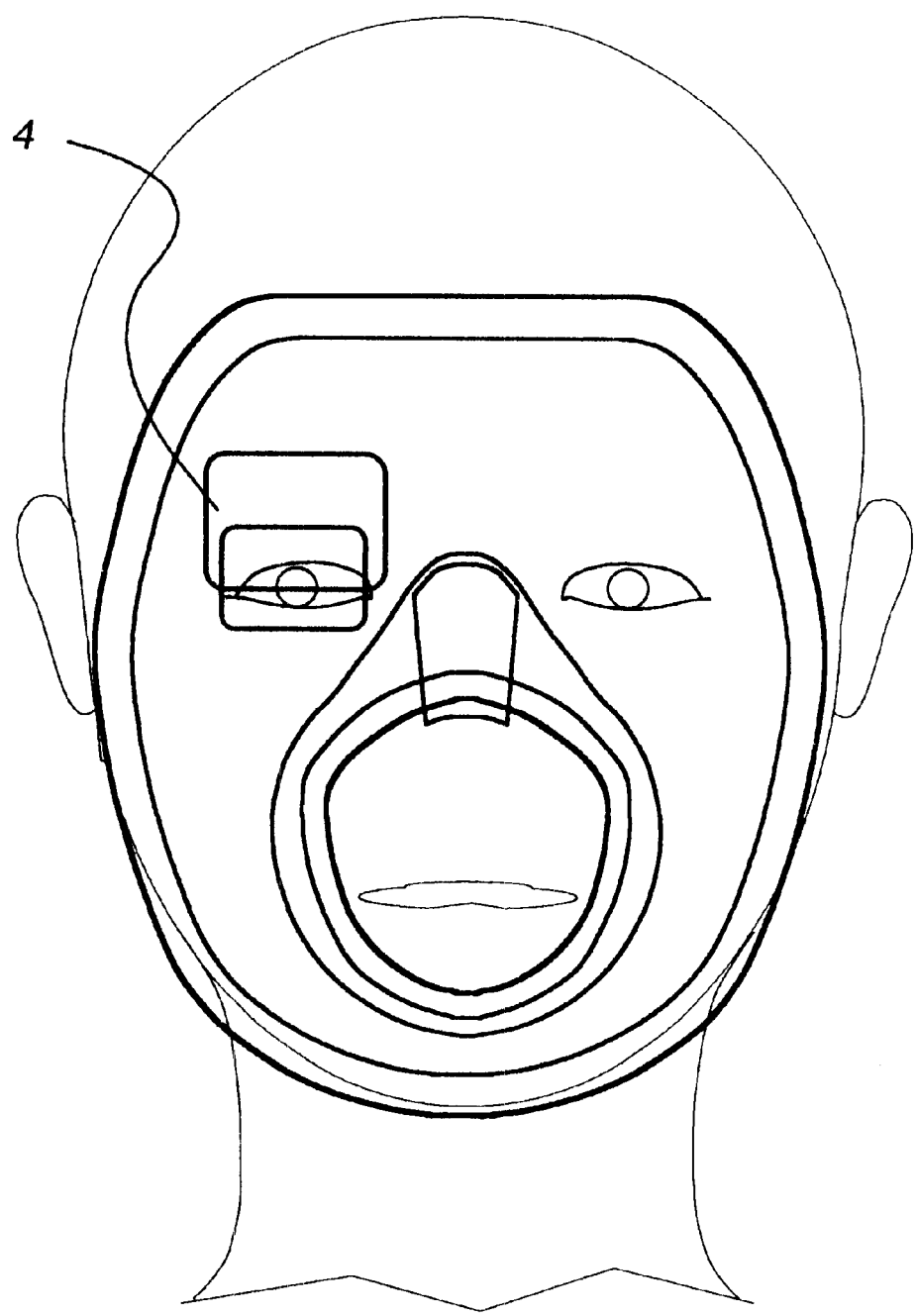
FIG. 1 shows a front view of a user with a mask with one placement of the display module, located between the eye and the inside surface of the mask.
Figure 2:
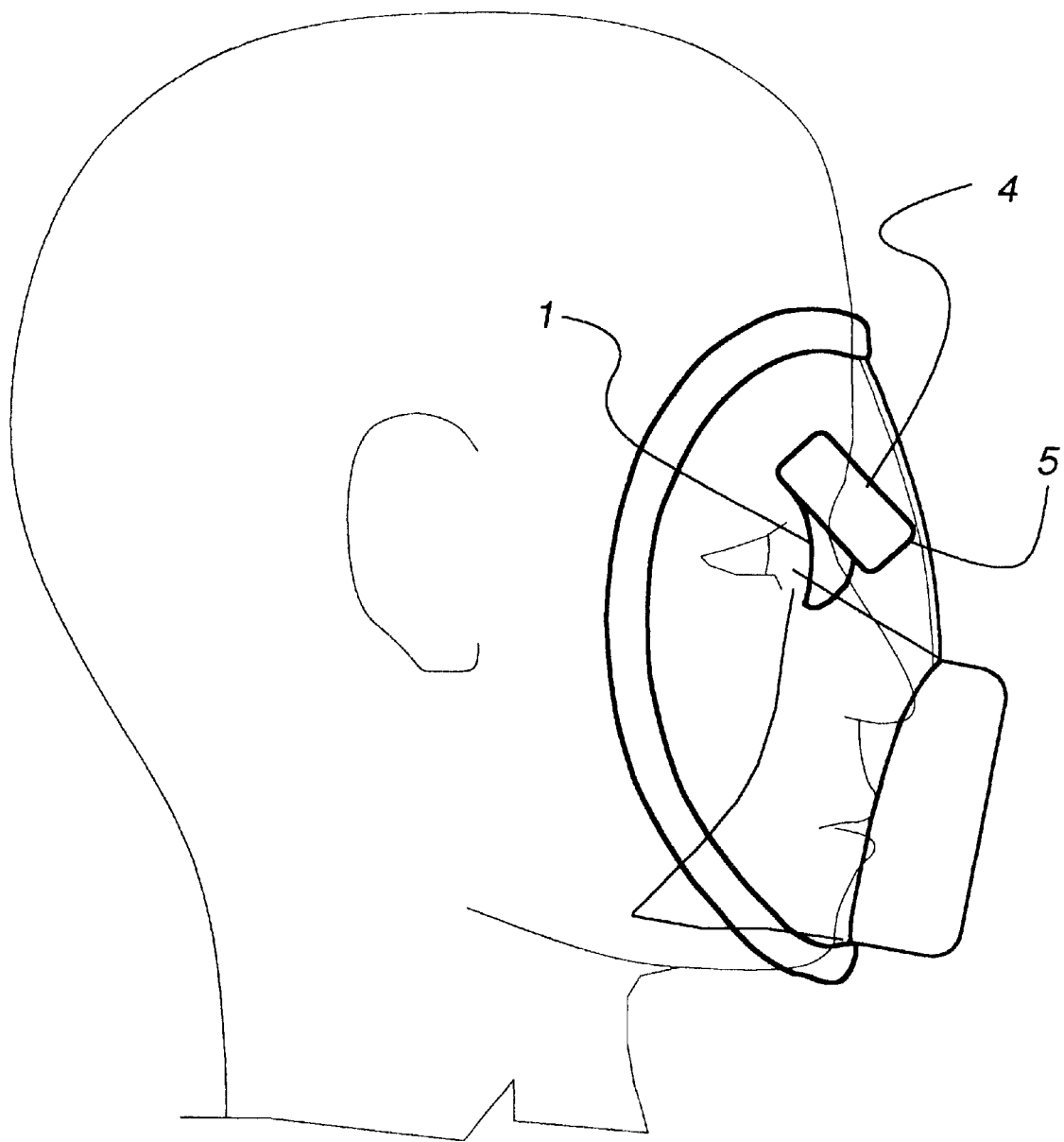
FIG. 2 shows a side view of a user with the mask and the display module located as in FIG. 1.
Figure 3:
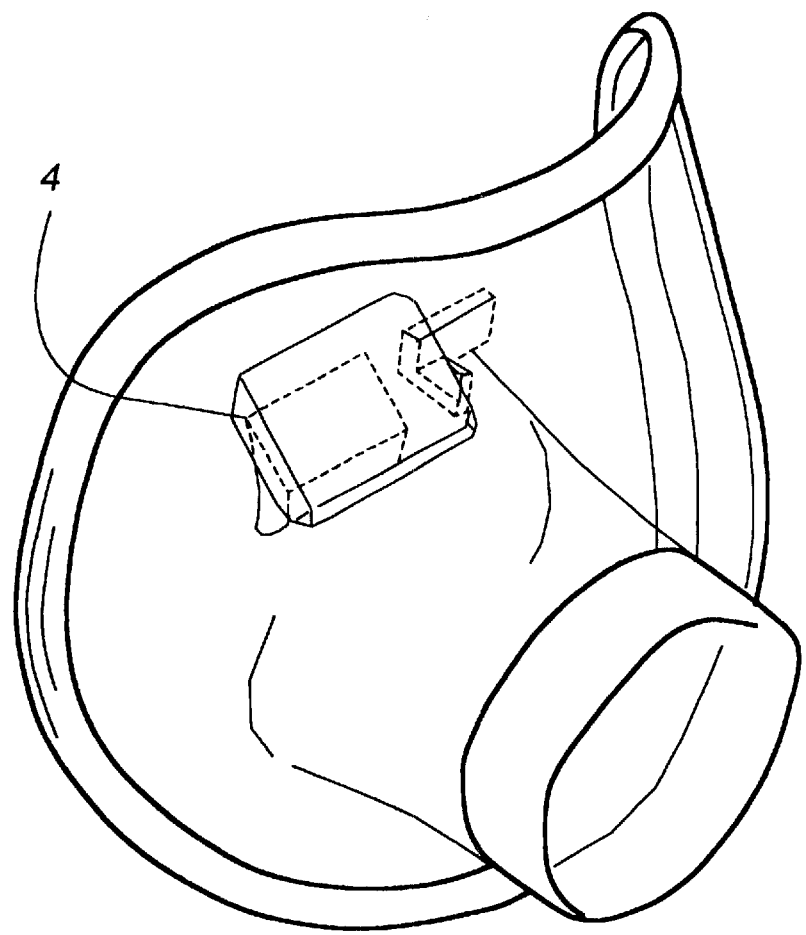
FIG. 3 is a perspective view of the installation of the module as shown in FIG. 1.

The FIGS. 1, 2 and 3 illustrate a mounting inside a gas or fire mask, with the module 4 located over one eye.

The Olympus curvilinear prism is very compact with excellent optical characteristics. The part number is FSP-01. The AMEL display is from Planar Systems. The suitable alternate of AMEL, includes LCOS, LCD and organic technology. The one shown in FIG. 4 is 640×512 resolution analog with physical dimensions of 0.302"×0.242" mounted on a glass and epoxy sandwich.

The controller for the Planar display chip is a Dual Internal Modulated electronic controller.

The prism yields a angle of view of >35° thus allowing a placement inside a visor or helmet that need not be precise or ultra stable. The AMEL display has characteristics of power usage of <300 mw, environmental range of −40° to +75° C. and high contrast.

This allows for use in a wide range of circumstances with good quality images even in bright lights.

The signal input can be digital or analog and can be single or multiple sources. These may be a remote camera, an infrared camera, a computer or sensor data, such as monitors for temperature, carbon monoxide or other toxic gases.

The user would then have readily available signals with multiple signal feeds with a switch to switch the view on the display to those that are most useful at the moment. If there is heavy smoke, the infrared view may give life saving information about hot spots, exits, or rescue of people. If there is a possibility of noxious or toxic gases or radioactive exposure, the selection of appropriate monitors could be made so as to get immediate readings.

Another use would be GPS (Global Positioning System) information could be given with appropriate map overlays as a route finder. This could be used for emergency route finding in a plant or installation at night, during limited visibility or in a complex installation. It is also usable for more mundane route finding, such as roads and street maps for emergency vehicles or any movement about unfamiliar territory.

The prism also has the capability of allowing two image signals to be available to the user's eye. One signal would be the display chip signal entering the prism as surface 3 which then is viewable to the user. The second signal is the surroundings as a line of sight from the eye to the prism and beyond. This view of the user's surroundings can be transmitted through the prism to the user's eye with available optics. Both of the signals or views can then be seen by the user. This is helpful if the location of the prism, either in the normal line of sight or in the peripheral sight area, ends up blocking an area of view that blocking is not desirable.

We claim:

1. A monocular head display apparatus comprised of:
a) a curvilinear prism with an image side;
b) an Active Matrix Electro-luminescent display chip with its display area attached to the image side of the prism;
c) a controller operatively connected to the display chip to make a signal into an image on the display chip; and
d) a source of a signal which is fed to the controller; wherein the prism and the display chip are positioned on a helmet to transmit the image of the signal to be incident upon a user's eye.

\* \* \* \* \*